US008958362B2

(12) United States Patent
Magistretti et al.

(10) Patent No.: US 8,958,362 B2
(45) Date of Patent: Feb. 17, 2015

(54) METHOD AND SYSTEM FOR WIRELESSLY TRANSMITTING DATA

(75) Inventors: Eugenio Magistretti, Bologna (IT); Omer Gurewitz, Omer (IL); Edward W. Knightly, Houston, TX (US)

(73) Assignee: William Marsh Rice University, Houston, TX (US)

( * ) Notice: Subject to any disclaimer, the term of this patent is extended or adjusted under 35 U.S.C. 154(b) by 114 days.

(21) Appl. No.: 13/594,046

(22) Filed: Aug. 24, 2012

(65) Prior Publication Data
US 2014/0056231 A1 Feb. 27, 2014

(51) Int. Cl.
*H04B 7/212* (2006.01)
*H04W 4/00* (2009.01)

(52) U.S. Cl.
USPC .......................................... 370/322; 370/338

(58) Field of Classification Search
USPC .................................................. 370/322, 338
See application file for complete search history.

(56) References Cited

U.S. PATENT DOCUMENTS

| | | | |
|---|---|---|---|
| 2002/0136723 A1* | 9/2002 | Feldmann et al. | 424/145.1 |
| 2003/0202499 A1* | 10/2003 | Thron et al. | 370/342 |
| 2010/0142559 A1* | 6/2010 | Hu | 370/474 |
| 2011/0208868 A1* | 8/2011 | Walsh et al. | 709/227 |
| 2011/0243039 A1* | 10/2011 | Papasakellariou et al. | 370/280 |
| 2012/0195212 A1* | 8/2012 | Zhang et al. | 370/252 |
| 2013/0100903 A1* | 4/2013 | Pajukoski et al. | 370/329 |

OTHER PUBLICATIONS

S.M. Kay. Fundamentals of Statistical Signal Processing—vol. 2. Prentice Hall, 1998. (17 pages).
M. Richards. Fundamentals of Radar Signal Processing. McGraw-Hill, 2005. (54 pages).
R. Van Nee, R. Prasad. OFDM for Wireless Multimedia Communications. Artech House, 2000. (15 pages).
Merlin, Simone, et al. MAC Header Compression. IEEE 802.11-12/0646r0, May 2012 (14 pages).
Liu, Yong, et al. Short CTS. IEEE 802.11-12/0643r0, May 2012 (10 pages).
Zheng, Shoukang et al. Header Compression. IEEE 802.11-12/0609r0, May 2012 (12 pages).
Lei, Zander, et al. ACK Transmission. IEEE 802.11-1210400r0, Mar. 2012 (9 pages).
Liu, Yong, et al. Short Ack. IEEE 802.11-1210324r2, Mar. 2012 (15 pages).
Chu, Liwen et al. Frame Header Compression. IEEE 802.11-12/0110r8, May 2012 (10 pages).

(Continued)

*Primary Examiner* — Andrew Lee
(74) *Attorney, Agent, or Firm* — Osha Liang LLP

(57) ABSTRACT

A method for transmitting data from a sender to a receiver over a channel. The method includes identifying the receiver, obtaining an initiation correlated symbol sequence (CSS) associated with the receiver, transmitting the initiation CSS, where the sender and the receiver are configured to communicate over the channel, where the channel is a frequency band in a radio-frequency spectrum. The method further includes receiving a first reservation CSS from the receiver signaling that the receiver has reserved the channel in order to receive the data from the sender. In response to receiving the first reservation CSS, transmitting the data to the receiver, and receiving an acknowledgment CSS from the receiver signaling that the receiver has received the data from the sender.

20 Claims, 9 Drawing Sheets

(56) References Cited

OTHER PUBLICATIONS

IEEE Std 802.11-2007—Part 11: Wireless LAN Medium Access Control (MAC) and Physical Layer (PHY) Specifications. IEEE, Jun. 12, 2007. http://standards.ieee.org/about/get/802/802.11.html (1184 pages).

V. Barghavan, A. Demers, S. Shenker, and L. Zhang. MACAW: a Media Access Protocol for Wireless LAN's. In Proc. of ACM SIGCOMM, 1994 (14 pages).

G. Bianchi. Performance Analysis of the IEEE 802.11 Distributed Coordination Function. IEEE Journal on Selected Areas in Communications, vol. 18, No. 3: 535-547, Mar. 2000. (13 pages).

J. Camp, E. Aryafar, E. Knightly. Coupled 802.11 Flows in Urban Channels: Model and Experimental Evaluation. In Proc. of IEEE INFOCOM, 2010. (9 pages).

T. Cui, L. Chen, T. Ho. Energy Efficient Opportunistic Network Coding for Wireless Networks. In Proc. of IEEE INFOCOM, 2008. (9 pages).

D.S.J. De Couto, D. Aguayo, J.C. Bicket, and R. Morris. A High-Throughput Path Metric for Multi-Hop Wireless Routing. In Proc. of ACM MobiCom, Sep. 2003. (13 pages).

E.O. Elliot. Estimates of Error Rates for Codes on Burst-Noise Channels. Bell Syst. Tech. J., 42(5): 1977-1997, Sep. 1963. (22 pages).

S. Gollakota, D. Katabi. ZigZag Decoding: Combating Hidden Terminals in Wireless Networks. In Proc. of ACM SIGCOMM, Aug. 2008. (12 pages).

S. Hong, S. Katti. DOF: A Local Wireless Information Plane. In Proc. of ACM SIGCOMM, Aug. 2011. (12 pages).

R.K. Jain, D.M.W. Chiu, and W. Hawe. A Quantitative Measure of Fairness and Discrimination for Resource Allocation in Shared Computer System. Technical Report TR-301, DEC Research, Sep. 26, 1984. (38 pages).

P. Karn. MACA—A New Channel Access Method for Packet Radio. In Proc. of ARRL Computer Networking Conference, 1990. (5 pages).

F.P. Kelly, A.K. Maulloo, and D.K.H. Tan. Rate control for communication networks: shadow prices, proportional fairness and stability. Journal of the Operational Research Society, 49(3): 237-252, Mar. 1998. (16 pages).

K. LaCurts and H. Balakrishnan. Measurement and Analysis of Real-World 802.11 Mesh Networks. In Proc. of ACM IMC Nov. 2010. (14 pages).

T. Li, M.K. Han, A. Bhartia, L. Qiu, E. Rozner, Y. Zhang and B. Zarikoff. CRMA: Collision-Resistant Multiple Access. In Proc. of ACM MobiCom, Sep. 2011. (12 pages).

E. Magistretti, K.K. Chintalapudi, B. Radunovic, and R. Ramjee. WiFi-Nano: Reclaiming WiFi Efficiency Through 800 ns Slots. In Proc. of ACM MobiCom, Sep. 2011. (12 pages).

B. Radunovic, D. Gunawardena, P. Key, A. Proutiere, N. Singh, V. Balan, and G. Dejean. Rethinking Indoor Wireless Mesh Design: Low Power, Low Frequency, Full-duplex. In Proc. of IEEE WiMesh, 2010. (6 pages).

D.V. Sarwate and M.B. Pursley. Crosscorrelation Properties of Pseudorandom and Related Sequences. Proceedings of the IEEE, vol. 68, No. 5: 593-619, May 1980. (27 pages).

S. Sen, R.R. Choudury, and S. Nelakuditi. CSMA/CN: Carrier Sense Multiple Access with Collision Notification. Proc. of ACM MobiCom, Sep. 2010. (12 pages).

S. Sen, R.R. Choudury, and S. Nelakuditi. No Time to Countdown: Migrating Backoff to the Frequency Domain. In Proc. of ACM MobiCom, Sep. 2011 (12 pages).

K. Tan, H. Liu, J. Fang, W. Wang, J. Zhang, M. Chen, and G. Voelker. SAM: Enabling Practical Spatial Multiple Access in Wireless LAN. In Proc. of ACM MobiCom, Sep. 2009. (12 pages).

F. Tobagi and L. Kleinrock. Packet Switching in Radio Channels: Part II-The Hidden Terminal Problem in Carrier Sense Multiple-Access and the Busy-Tone Solution. IEEE Transactions on Communications, vol. 23, No. 12: 1417-1433, Dec. 1975. (17 pages).

A. Willig, M. Kubish, C. Hoene and A. Wolisz. Measurements of a Wireless Link in an Industrial Environment Using an IEEE 802.11-Compliant Physical Layer. IEEE Transactions on Industrial Electronics, vol. 49, No. 6: 1265-1282, Dec. 2002. (18 pages).

X. Zeng, R. Bagrodia, M. Gerla. GloMoSim: A Library for Parallel Simulation of Large-scale Wireless Networks. In Proc. of IEEE PADS, 1998. (8 pages).

X. Zhang and K. Shin. E-MiLi: Energy-Minimizing Idle Listening in Wireless Networks. In Proc. of ACM MobiCom, Sep. 2011. (12 pages).

\* cited by examiner

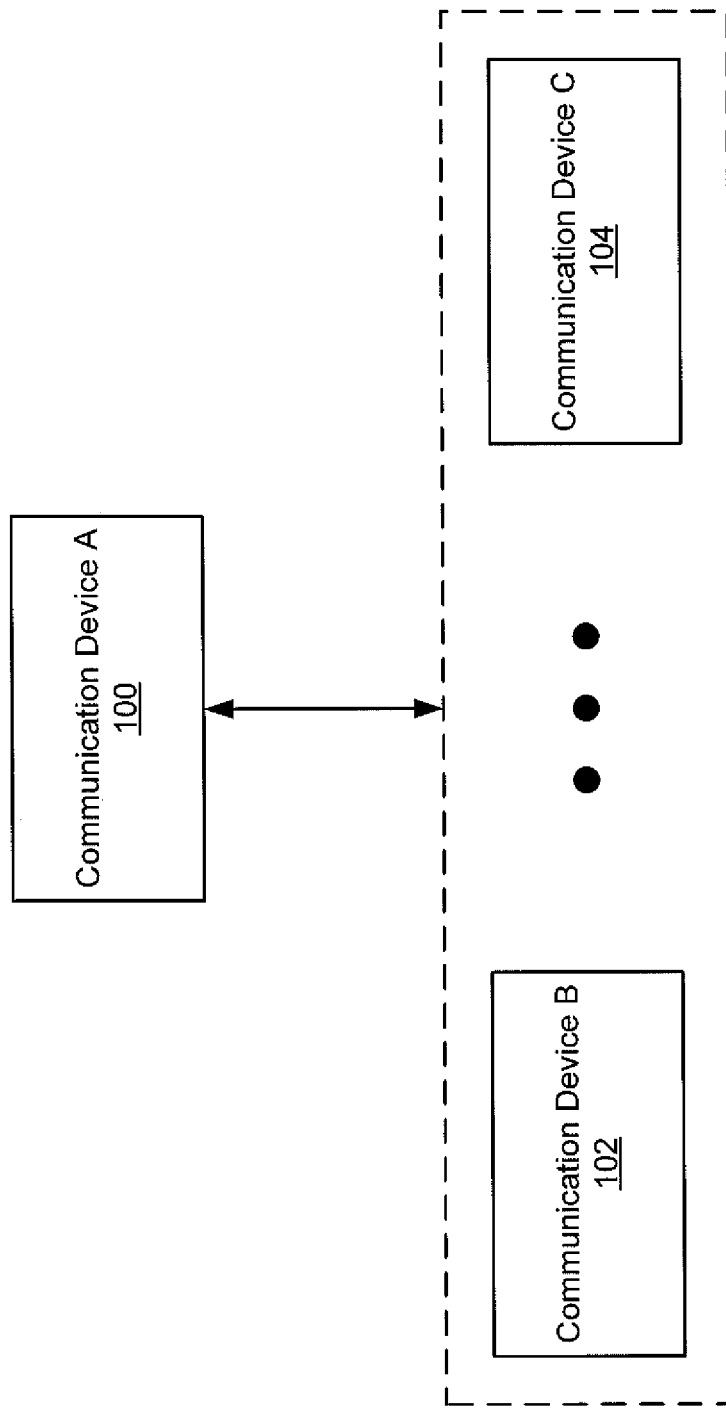

METHOD AND SYSTEM FOR WIRELESSLY TRANSMITTING DATA

STATEMENT REGARDING FEDERALLY SPONSORED RESEARCH OR DEVELOPMENT

The invention was made with government support under Grant Number CNS-0721894 awarded by the National Science Foundation. The government has certain rights in the invention.

The invention was made with government support under Grant Number CNS-0751173 awarded by the National Science Foundation. The government has certain rights in the invention.

BACKGROUND

Wireless communication protocols such as IEEE 802.11 are designed to support communication between multiple devices operating over the same channel (i.e., a frequency band in a radio-frequency spectrum). In order to transmit data over the channel between two devices when multiple devices are operating the same channel, a channel reservation mechanism is used. One such channel reservation mechanism uses Ready to Send (RTS) and Clear to Send (CTS) control messages to reserve the channel in order to enable the two devices to communicate with minimal or no collisions.

The RTS control message includes, among other information, the following: preambles, frame control information, duration information, the address of the transmitting device, and the address of the receiving device. The CTS control message includes, among other information, the following: preambles, frame control information, duration information, and the address of the receiving device. The devices that receive the RTS control message and/or the CTS control message must receive and subsequently decode the control message where the decoding is performed in a media access control (MAC) layer that is located in a data link layer (DLL) of the devices receiving the message.

The amount of information conveyed in the RTS control message and CTS control message results in a relatively large overhead (both in terms of information transferred, the use of physical layer preambles, and processing time required) and, as a result, degrades performance of the wireless communication between devices over the channel.

SUMMARY

In general, in one aspect, the invention relates to a method for transmitting data from a sender to a receiver over a channel, identifying the receiver, obtaining an initiation correlated symbol sequence (CSS) associated with the receiver, transmitting the initiation CSS, wherein the sender and the receiver are configured to communicate over the channel, wherein the channel is a frequency band in a radio-frequency spectrum, receiving a first reservation CSS from the receiver signaling that the receiver has reserved the channel in order to receive the data from the sender, in response to receiving the first reservation CSS, transmitting the data to the receiver, and receiving an acknowledgment CSS from the receiver signaling that the receiver has received the data from the sender.

In general, in one aspect, the invention relates to a method for receiving data by a receiver from a sender over a channel. The method includes receiving an initiation correlated symbol sequence (CSS) from the sender over the channel, wherein sender and the receiver are configured to communicate wirelessly over the channel, wherein the channel is a frequency band in a radio-frequency spectrum, in response to receiving the initiation CSS, transmitting a reservation CSS to the sender signaling that the receiver has reserved the channel in order to receive the data from the sender, in response to transmitting the reservation CSS, receiving the data from the sender, and after the data has been received: transmitting an acknowledgment CSS to the sender signaling that the receiver has received the data from the sender, transmitting a Channel Free CSS from the receiver signaling that the channel is no longer reserved by the receiver.

In general, in one aspect, the invention relates to a system. The system includes a sender, a receiver, and a second receiver, wherein the sender is a first communication device, the receiver is a second communication device, and the second receiver is a third communication device, wherein the sender, the receiver, and the second receiver are configured to communicate over the channel, wherein the channel is a frequency band in a radio-frequency spectrum. The sender is configured to identify the receiver, obtain an initiation correlated symbol sequence (CSS) associated with the receiver, transmit the initiation CSS over the channel, receive a reservation CSS from the receiver signaling that the receiver has reserved the channel in order to receive the data from the sender, in response to receiving the reservation CSS, transmit the data to the receiver, receive an acknowledgment CSS from the receiver signaling that the receiver has received the data from the sender, receive a Channel Free CSS from the receiver signaling that the channel is no longer reserved by the receiver. The receiver configured to receive the initiation CSS, transmit the reservation CSS to the sender, receive the data from the sender, and after the data has been received transmit the acknowledgment CSS over the channel, transmit the Channel Free CSS over the channel. The second receiver configured to receive the initiation CSS, the reservation CSS, the acknowledgement CSS, and the Channel Free CSS over the channel, wherein the second receiver cannot correlate the initiation CSS, wherein the second receiver is able to correlate the reservation CSS, wherein the second receiver cannot correlate the acknowledgment CSS, and wherein the second receiver is able to correlate the Channel Free CSS.

Other aspects of the invention will be apparent from the following description and the appended claims.

BRIEF DESCRIPTION OF DRAWINGS

FIGS. 1A and 1B show system configurations in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for wirelessly transmitting data. More specifically, embodiments of the invention relate to a method and system for reserving a channel to enable one communication device to transmit data to another communication device, where reserving the channel includes using reservation primitives. Further, embodiments of the invention relate to reserving the channel by transmitting the reservation primitives in a particular sequence and at particular times.

As used in this application, the term sender(s) refers to a communication device that is transmitting data (which is distinct from reservation primitives) to a receiver. As used in this application, the term receiver(s) refers to a communication device that receives data (which is distinct from reservation primitives) from a sender or to which the data is being sent or otherwise transmitted from the sender. Those skilled in the art will appreciate that a single communication device may be configured to operate as both a sender and receiver.

As used in this application, the term medium refers to the radio-frequency spectrum that is the part of the electromagnetic spectrum corresponding to radio frequencies. The radio frequency spectrum may include, but is not limited to, frequencies at or above 3 Hz and at or below 300 GHz.

As used in this application, a channel corresponds to a frequency band in the radio frequency spectrum. The width of the frequency band may vary based on the implementation of the channel.

Figure 1B:
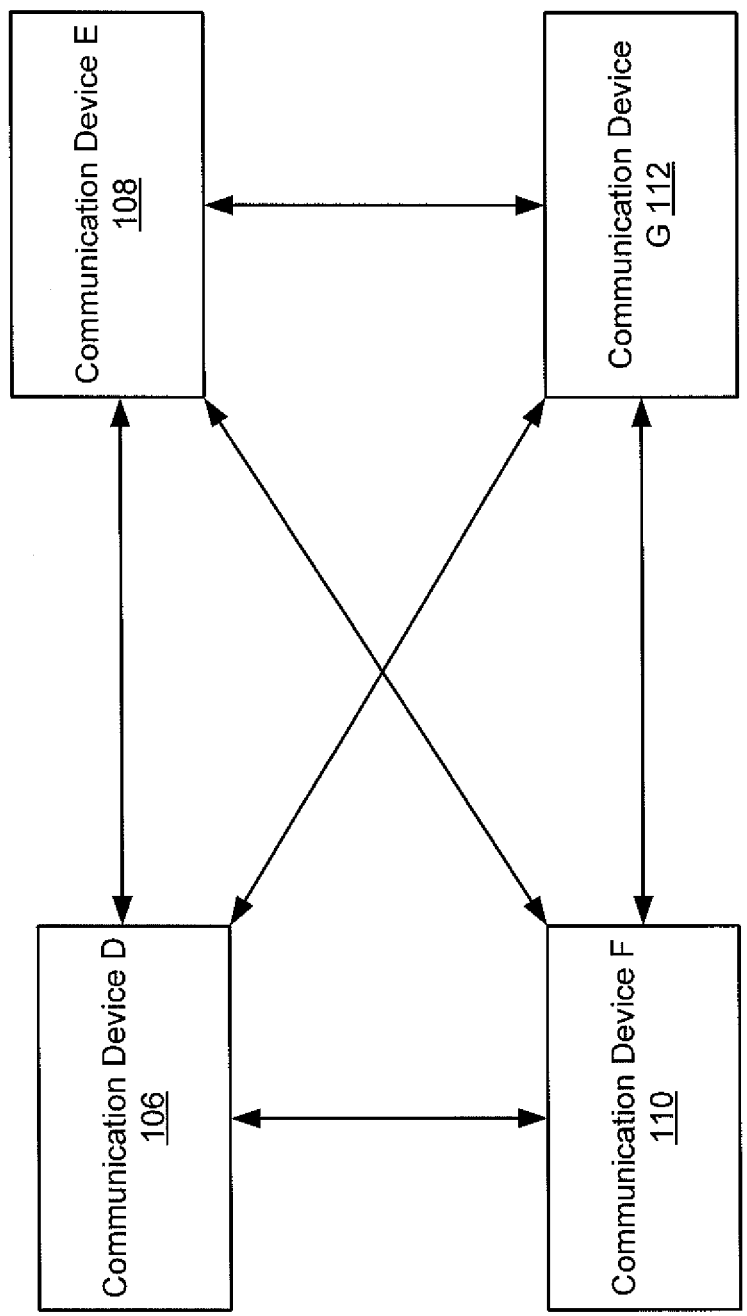

FIGS. 1A and 1B show system configurations in accordance with one or more embodiments of the invention. Referring to FIG. 1A, the system includes three communication devices (100, 102, 104). In the configuration shown in FIG. 1A, communication device A (100) may be acting as a wireless access point (AP). In one embodiment of the invention, the wireless AP functions as a bridge between the communication devices (102, 104) and another network (not shown). The wireless AP may be connected directly or indirectly to the other network. Alternatively, or additionally, the wireless AP may be connected to another wireless AP (not shown), which in turn is connected to other communication devices.

All communication devices in FIG. 1A communicate with each other using one or more channels. In one embodiment of the invention, communication device A (100) may act as a sender and/or a receiver. When acting as a sender, communication device A (100) may transmit data and reservation primitives to communication devices B and C (102, 104). When acting as a receiver, communication device A (100) may receive data and correlate reservation primitives from communication devices B and C (102, 104).

In one embodiment of the invention, communication device B (102) may act as a sender and/or a receiver. When acting as a sender, communication device B (102) may transmit data to communication device A (100) but not to communication device C (104). Said another way, communication device B (102) may include one or more reservation primitives necessary to initiate reservation of the channel, but either communication B (102) or communication device C (104) does not include a correlator(s) configured to correlate at least one of the reservation primitives necessary to reserve the channel to enable data to be transferred between communication devices B and C. When acting as a receiver, communication device B (102) may receive data from communication device A (100) but not from communication device C (104). However, regardless of whether communication device B (102) is acting as a sender or receiver, communication device B (102) may transmit certain reservation primitives (e.g., reservation CSS and channel free CSS) to communication device C (104) and communication device B (102) may correlate certain reservation primitives (e.g., reservation CSS and channel free CSS) from communication device C (104).

In one embodiment of the invention, communication device C (104) may act as a sender and/or a receiver. When acting as a sender, communication device C (104) may transmit data to communication device A (100) but not to communication device B (102). Said another way, communication device C (104) may include one or more reservation primitives necessary to initiate reservation of the channel, but either communication B (102) or communication device C (104) does not include a correlator(s) configured to correlate at least one of the reservation primitives necessary to reserve the channel to enable data to be transferred between communication devices B and C. When acting as a receiver, communication device C (104) may receive data from communication device A (100) but not from communication device B (102). However, regardless of whether communication device C (104) is acting as a sender or receiver, communication device C (104) may transmit certain reservation primitives (e.g., reservation CSS and channel free CSS) to communication device B (102) and communication device C (104) may correlate certain reservation primitives (e.g., reservation CSS and channel free CSS) from communication device B (102).

Those skilled in the art will appreciate that while communication device B (102) and communication device C (104) may not directly transmit data to each other, communication device B (102) and communication device C (104) may transmit data to each other via communication device A (100).

Referring to FIG. 1B, FIG. 1B shows a system that includes four communication devices (106, 108, 110, 112) in an ad hoc configuration. In this configuration, the communication devices communicate directly with each other (as opposed to communicating via a wireless AP). While the particular ad hoc configuration shown in FIG. 1B corresponds to a fully connected mesh, embodiments of the invention may be implemented using any ad hoc configuration without departing from the invention. Further, while the particular ad hoc configuration shown in FIG. 1B indicates that all communication devices communicate bi-directionally (i.e., each communication device may act as sender or receiver) with all other communication devices, embodiments of the invention may be implemented in which one or more communication devices only communicates uni-directionally (i.e., only acts a sender or receiver) with one or more other communication devices without departing from the invention.

Figure 2:
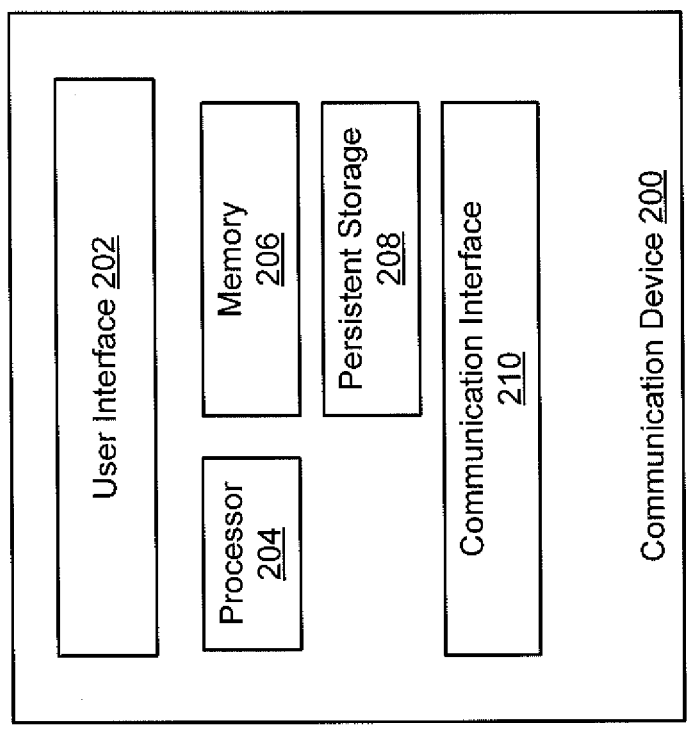
FIG. 2 shows a communication device in accordance with one or more embodiments of the invention.

FIG. 2 shows a communication device in accordance with one or more embodiments of the invention. In one embodiment of the invention, the communication device includes functionality to implement one or more embodiments of the invention. The communication device may correspond to any device that includes functionality to implement embodiments of the invention and, in particular, includes functionality to transmit and/or receive data and reservation primitives over one or more channels. Examples of communication devices may include, but are not limited to, a phone, smart phone, a laptop, a wireless access point, a wireless router, a gaming console, a set top box, a television, a tablet computer, and a desktop computer.

In one embodiment of the invention, the communication device may include the following components: a communication interface (210), a persistent storage (208), a memory (206), a processor (204), and a user interface (202). The communication device may include greater, fewer, or different components than shown in FIG. 2 without departing from the invention. Each of the aforementioned components is described below.

In one embodiment of the invention, the communication interface (210) includes a physical layer and a media access control (MAC) layer. The physical layer includes one or more antennas configured to transmit and/or receive data and reservation primitives. In addition, the physical layer includes one or more correlators configured to detect receipt of various reservation primitives using cross-correlation (i.e., functionality to measure the similarity of two waveforms of a signal as a function of a time-lag applied to one of them). More specifically, a correlator is configured to compare a received signal with a known sequence (i.e., a reservation primitive) to generate a numerical value. This numerical value is compared against a threshold and, if the numerical value exceeds the threshold, then the received signal is deemed to match the known signal (i.e., the correlator has correlated the signal). The value of threshold may be set based on the implementation of the invention. However, in general, a higher value of the threshold decreases the probability of false positives at the expense of a large probability of false negatives; vice versa, a lower threshold increases the occurrence of false positives. In one embodiment of the invention, the theory of correlation in Gaussian noise may be used to determine an optimal threshold for a signal detection at a Signal to Interference plus Noise Ratio (SINR). Other methods may be used to determine the optimal threshold without departing from the invention.

In one embodiment of the invention, by enabling correlation in the physical layer, the communication device is able to (i) reduce processing time for the reservation primitives as they do not need to be decoded by the MAC layer (as compared with RTS and CTS control messages, (ii) receive and correlate reservation primitives from any communication device while receiving data from a communication device.

For purposes of this invention, if a correlator is able to detect the signal then the correlator is deemed to be able to correlate. In contrast, if the correlator is unable to detect the signal (i.e., it appears as white noise the correlator) then the correlator is deemed to be unable to correlate the signal. In one embodiment of the invention, the physical layer may include at least four correlators—one for each type of reservation primitive. In one embodiment of the invention, the MAC layer includes functionality to take various actions based upon receipt (or non-receipt) of various reservation primitives and data as described with respect to various steps in FIGS. 4 and 5. The MAC layer may be implemented using software instructions stored in the persistent storage (208) and executed by the processor (204). Alternatively, the MAC layer may be implemented using an integrated circuit (e.g., but not limited to, Application-Specific Integrated Circuits), Field Program Gate Array (FPGA), or any other specialized hardware. Those skilled in the art will appreciate that the MAC layer may be implemented using a combination of software and hardware (i.e., integrated circuits, FPGAs, specialized hardware) without departing from the invention.

Depending on the implementation of the communication device, the communication device may have multiple communication interfaces. In such cases, one or more of the communication interfaces may be a wired communication interface, e.g., an interface that support Ethernet, or a wireless communication interface that supports IEEE 802.11 and/or other wireless protocols such as Bluetooth®. The communication device may support other communication protocols without departing from the invention. (Bluetooth® is a registered trademark of Bluetooth SIG., Inc.)

In one embodiment of the invention, the communication interface is configured to transmit signals (corresponding to reservation primitives and/or data). The distance that the signal may travel and still be detected by a receiver refers to the transmission range.

In one embodiment of the invention, the persistent storage (208) corresponds to any non-volatile storage. Examples of persistent storage include, but are not limited to, magnetic storage, optical storage, solid state storage, phase change storage, any other suitable type of persistent storage, or any combination thereof. In one embodiment of the invention, the persistent storage (208) may include software instructions to implement at least a portion of the MAC layer. Further, the persistent storage (208) may include software instructions to implement other functionality of the communication device. The persistent storage (208) may also include a Correlated Symbol Sequence (CSS) dictionary (described below).

In one embodiment of the invention, the memory (206) corresponds to any volatile memory including, but not limited to, Dynamic Random-Access Memory (DRAM), Synchronous DRAM, SDR SDRAM, and DDR SDRAM. In one embodiment of the invention, the memory (206) is configured to temporarily store information as required to implement the functionality of the communication device. In one or more embodiments of the invention, the memory may also be configured to store all or a portion of a CSS dictionary.

In one embodiment of the invention, the processor (204) corresponds to any processor (single or multi-core) configured to execute the aforementioned software. In one embodiment of the invention, the processor (204) has a complex instruction set computing (CISC) architecture. In another embodiment of the invention, the processor (204) has a reduced instruction set computing (RISC) processor. In one embodiment of the invention, the processor (204) has an Advanced RISC Machine (ARM) architecture. ARM is a registered trademark of ARM Ltd.

In one embodiment of the invention, the user interface (202) may include a display (not shown) and/or a keyboard (not shown). In one embodiment of the invention, the display corresponds to any output device that includes functionality to at least output alpha characters (either in the English alphabet, an alphabet of another language, or characters in another language) and/or numeric characters (either Arabic numerals, or other characters in another language that correspond to Arabic numerals). In one embodiment of the invention, the display is also configured to receive input directly from a user, for example, via a stylus or finger(s). In such embodiments the display may be a touch screen display implemented, for example, as a resistive touch screen or a capacitive touch screen. The size of the display may vary based on the implementation of the communication device.

In one embodiment of the invention, the keyboard is any input device that includes alpha characters (either in the English alphabet, an alphabet of another language, or characters in another language) and numeric characters (either Arabic numerals, or other characters in another language that correspond to Arabic numerals). In one embodiment of the invention, the keyboard is a QWERTY keyboard. In one embodiment of the invention, the keyboard may be combined with the display. For example, the display may include a virtual keyboard. Alternatively, the keyboard may be distinct from the display.

Those skilled in the art will appreciate that while the communication device (200) is described above as including various components, the components of the communication device may vary based on the type of communication device. For example, if the communication device is a wireless router, then it may not include a user interface but may include multiple communication interfaces implementing embodiments of the invention. Alternatively, if the communication device is a tablet, then it may include a user interface such as a touch screen and one or more communication interfaces implementing embodiments of the invention.

In one or more embodiments of the invention, reservation primitives are used to manage channel reservation. The particular reservation primitives stored on a given communication device are collectively referred to a CSS dictionary. The particular reservation primitives stored in the CSS dictionary include reservation primitives that the communication device must transmit in order to reserve a channel (see FIGS. 3A-5) and reservation primitives that the communication device must be able to correlate (or otherwise detect) (see FIGS. 3A-5). The contents of the CSS dictionary may vary over time. Further, the content of the CSS dictionary may be generated on the communication device and/or may be provided to the communication device from an external entity (e.g., another communication device or another device that is not a communication device).

In one embodiment of the invention, each reservation primitive is a binary sequence where: (i) the signal (generated from the binary sequence) is easy to distinguish from a time-shifted version of itself and (ii) the signal is easy to distinguish from other signals. In one embodiment of the invention, each reservation primitive is deterministically generated but may retain the statistical properties of sampled white noise. Further, cross-correlation (or other similar methods) may be used to determine whether a given signal (generated from a binary sequence) is received by a receiver (described below in FIGS. 4 and 5). In one embodiment of the invention, an existing set of control commands (which are not CSSes) used to reserve a channel may be converted or otherwise mapped to a set of reservation primitives and subsequently used to implement one or more embodiments of the invention.

In one embodiment of the invention, each reservation primitive is part of a set of binary sequences, where the set of binary sequences are Gold Codes that have a length of 127-bits. In another embodiment of the invention, the set of binary sequences are Kasami codes that have a length of 255-bits. Those skilled in the art will appreciate that other Gold or Kasami sequences with different lengths, or types of codes, or other binary sequences, such as m-sequences, with different lengths may be used without departing from the invention.

Figure 3A:
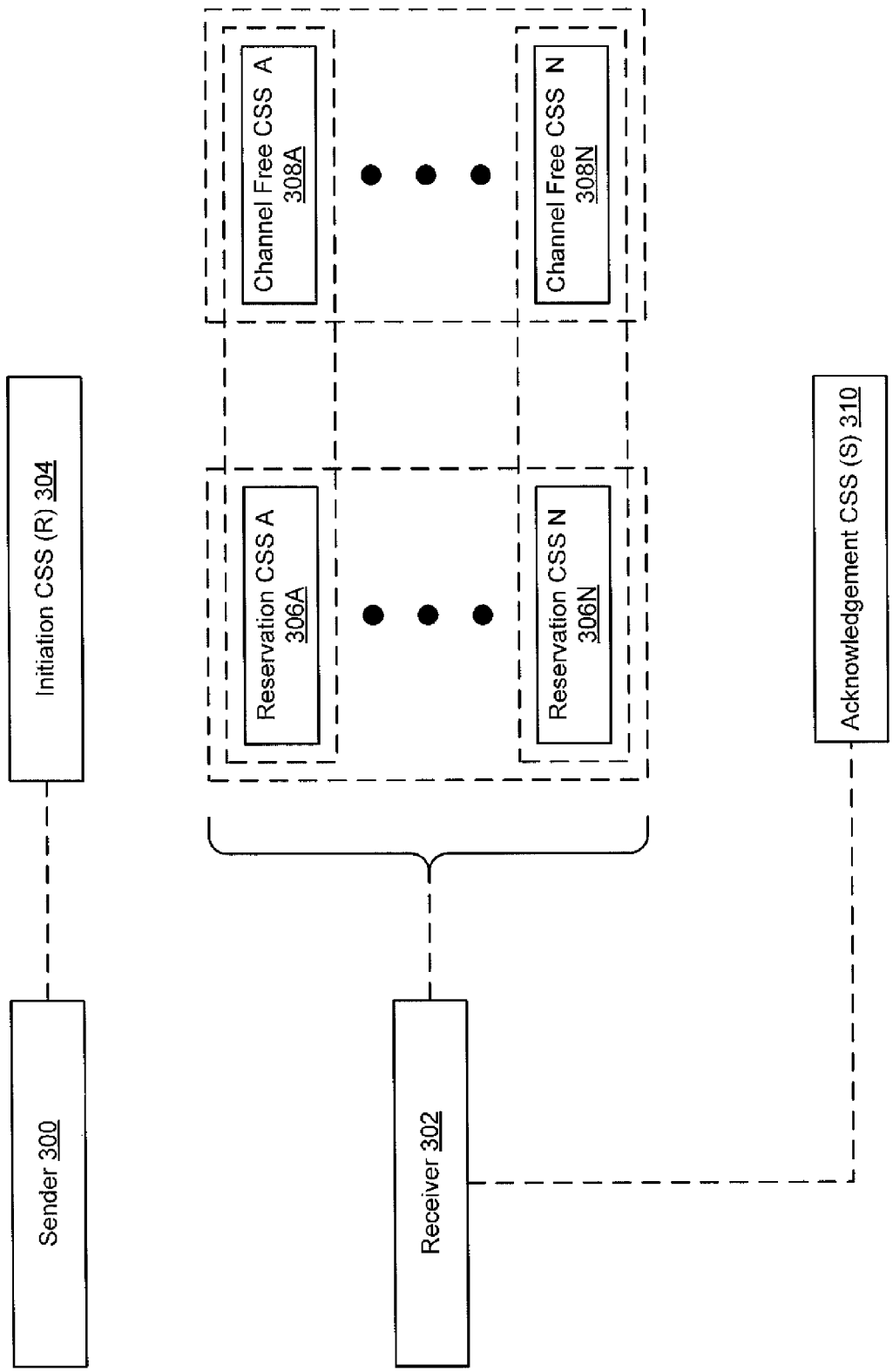
FIG. 3A shows reservation primitives in accordance with one or more embodiments of the invention.

FIG. 3A shows reservation primitives in accordance with one or more embodiments of the invention. In one embodiment of the invention, there are two classes of reservation primitives—private and public. Denoting a reservation primitive as private or public signifies whether a given reservation primitive can be correlated by a given receiver. In one embodiment of the invention, a reservation primitive that is denoted as private can only be correlated by a single receiver (or a single receiver within the transmission range of the communication device that transmitted the private reservation primitive). All other communication devices that receive the private reservation primitive view it as white noise. In contrast, a reservation primitive that is denoted as public can be correlated by all receivers (or all receivers within the transmission range of the communication device that transmitted the public reservation primitive).

In one embodiment of the invention, there are four types of the reservation primitives which are used to reserve a channel, the four types of reservation primitives include: Initiation CSS (R) (304), Reservation CSS (306A, 306N), Channel Free CSS (308A, 308N), and Acknowledgement CSS (S) (310). Though not necessary to implement the invention, a fifth reservation primitive—i.e., a negative acknowledgement CSS may be also used in various embodiments of the invention (see FIG. 5, Step 506). Each of the aforementioned reservation primitives is described below.

Turning to FIG. 3A, FIG. 3A shows the reservation primitives required to reserve a channel from the transmission of data between the sender (300) and the receiver (302). For purposes of FIG. 3A, the reservation primitives are associated with the communication device (denoted as sender (300) and receiver (302)) that is transmitting the particular reservation primitives.

The sender (300) is configured to transmit an Initiation CSS (R) (304) in order to signal the particular receiver that the sender (300) would like to reserve a channel in order to transmit data to the receiver. The Initiation CSS (R) (304) is a private reservation primitive that can only be correlated by a particular receiver.

The receiver (302) is configured to transmit a Reservation CSS (306A, 306N) in order to signal to the sender and all other communication devices within the transmission range that the receiver (302) has reserved the channel. The receiver (302) is configured to transmit a Channel Free CSS (308A, 308N) in order to signal to the sender and all other communication devices within the transmission range that the receiver (302) has freed the channel. In one embodiment of the invention, the receiver (302) includes multiple Reservation CSSes (306A, 306N) and multiple Channel Free CSSes (308A, 308N). In such cases, each Reservation CSS may be associated with a corresponding Channel Free CSS—collectively, this pair may be referred to a channel reservation pair. Accordingly, if the receiver (302) transmits a Reservation CSS, then only the Channel Free CSS that is in the channel reservation pair may be used to free the channel. The Reservation CSS and the Channel Free CSS are public reservation primitives.

The receiver (310) is configured to transmit an Acknowledgment CSS (S) (310) in order to signal to the particular sender (300) that the receiver (302) has received that data from the sender. The Acknowledgment CSS (S) (310) is a private reservation primitive that can only be correlated by a particular sender.

In one embodiment of the invention, for each direction of communication between two communication devices, at least one Initiation CSS (R) and one Acknowledgement CSS (S) is required. However, the same Reservation CSS and Channel Free CSS may be used for communication in both directions.

Figure 3B:
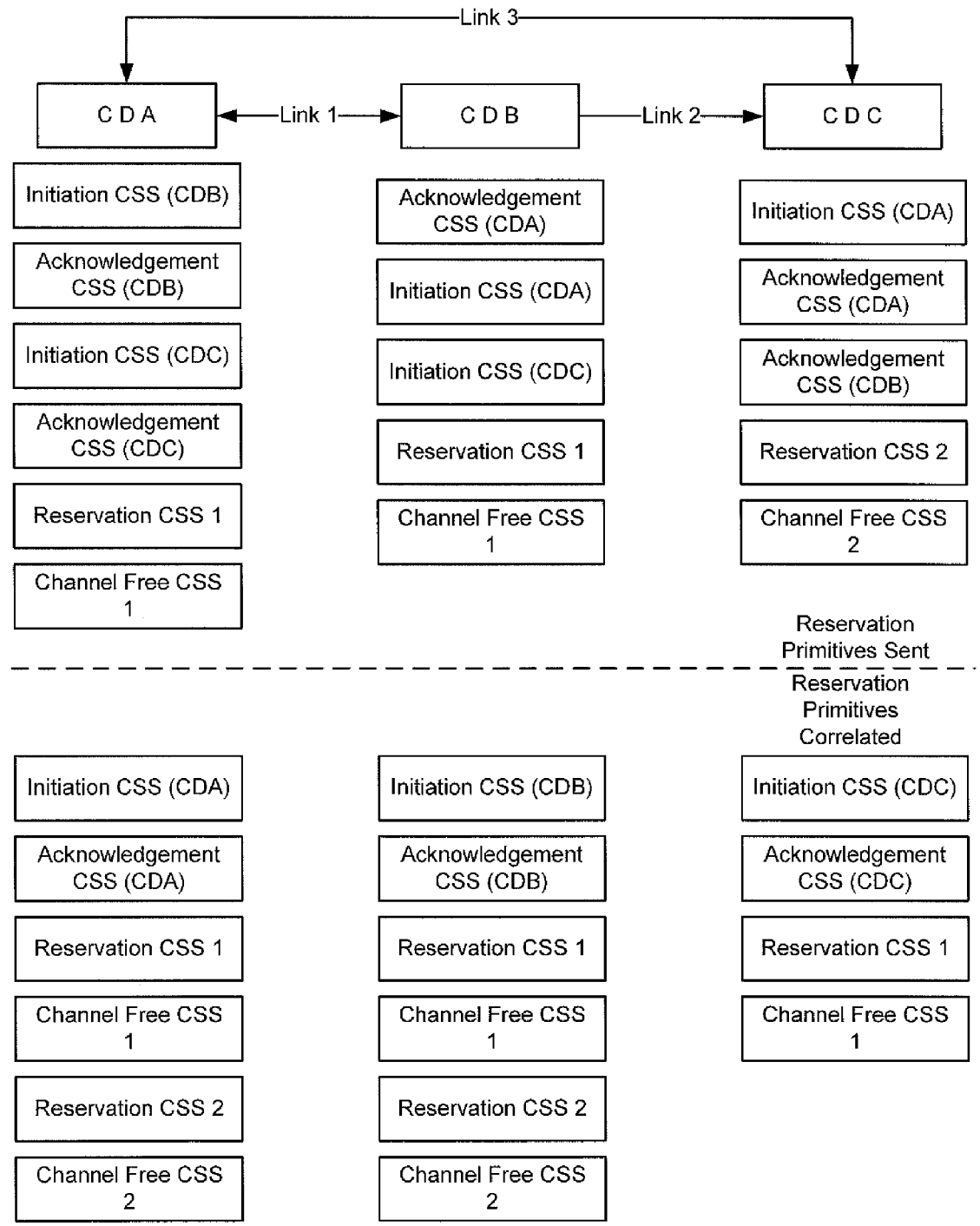
FIG. 3B shows an example of reservation primitives used to reserve a channel in accordance with one or more embodiments of the invention.

FIG. 3B shows an example of the various reservation primitives present at each communication device and what reservation primitives the particular communication device must be able to correlate in order to reserve a channel. The example is included to describe various aspects of one or more embodiments of the invention but is not intended to limit the scope of invention.

Turning to FIG. 3B, consider the scenario in which communication device A (CDA), communication device B (CDB) and communication device C (CDC) are configured to communicate over the same channel. More specifically, CDA is configured to communicate bi-directionally with CDB (over Link 1) and CDC (over Link 3). In addition, CDB is configured to communicate uni-directionally with CDC (over Link 2). In this context, bi-directional communication refers to the ability for a pair of communication devices to transmit and receive data (distinct from reservation primitives) from each other. Alternatively, uni-directional communication refers to the ability for one communication device to transmit data (distinct from reservation primitives) to another communication device, but not to receive data from this communication device. FIG. 3B shows the various reservation primitives each of the communication devices must be able to transmit and/or correlate in order to transmit data and/or receive data in accordance with one or more embodiments of the invention.

Turning to CDA, CDA includes functionality to: (i) transmit Initiation CSS (CDB), (ii) transmit Acknowledgement CSS (CDB), (iii) transmit Initiation CSS (CDC), (iv) transmit AcknowledgementCSS (CDC), and (v) transmit Reservation CSS 1 and Channel Free CSS 1 to reserve the channel when transmitting data to either CDB or CDC. Further, CDA is configured to receive and correlate: (i) Initiation CSS (CDA), (ii) Acknowledgment CSS (CDA), (iii) Reservation CSS 1 and Channel Free CSS 1, and (iv) Reservation CSS 2 and Channel Free CSS 2.

Turning to CDB, CDB includes functionality to: (i) transmit Initiation CSS (CDA), (ii) transmit Acknowledgement CSS (CDA), (iii) transmit Initiation CSS (CDC), (iv) transmit Reservation CSS 1 and Channel Free CSS 1 to reserve the channel when transmitting data to either CDA or CDC. Further, CDB is configured to receive and correlate: (i) Initiation CSS (CDB), (ii) Acknowledgment CSS (CDB), (iii) Reservation CSS 1 and Channel Free CSS 1, and (iv) Reservation CSS 2 and Channel Free CSS 2.

Turning to CDC, CDC includes functionality to: (i) transmit Initiation CSS (CDA), (ii) transmit Acknowledgement CSS (CDB), (iii) transmit Acknowledgement CSS (CDA), (iv) transmit Reservation CSS 2 and Channel Free CSS 2 to reserve the channel when transmitting data to either CDA or CDB. Further, CDB is configured to receive and correlate: (i) Initiation CSS (CDC), (ii) Acknowledgment CSS (CDC), (iii) Reservation CSS 1 and Channel Free CSS 1.

Those skilled in the art will appreciate the same Initiation CSS may be used by multiple senders when targeting the same receiver. Alternatively, each sender-receiver pair may use a unique Initiation CSS.

Those skilled in the art will appreciate the same Acknowledgement CSS may be used by multiple receivers when communicating with the same sender. Alternatively, each receiver-sender pair may use a unique Acknowledgement CSS.

Those skilled in the art will appreciate that the reservation primitives shown in FIG. 3B include the minimal set of reservation primitives that a given communication device must be able to transmit and/or correlate in order to transmit data in over the links shown in FIG. 3B. However, each of the communication devices may be able to transmit and/or correlate any CSS without departing from the invention.

In addition to the above primitives, reserving a channel also includes transmitting and/or receiving a reservation primitive in a particular sequence and/or at a particular time (which may be a relative time or an absolute time). The sequence of reservation primitives that must be transmitted or received to reserve the channel along with the timing of transmitting or receiving the reservation primitives is described below in FIGS. 4-5.

Figure 4:
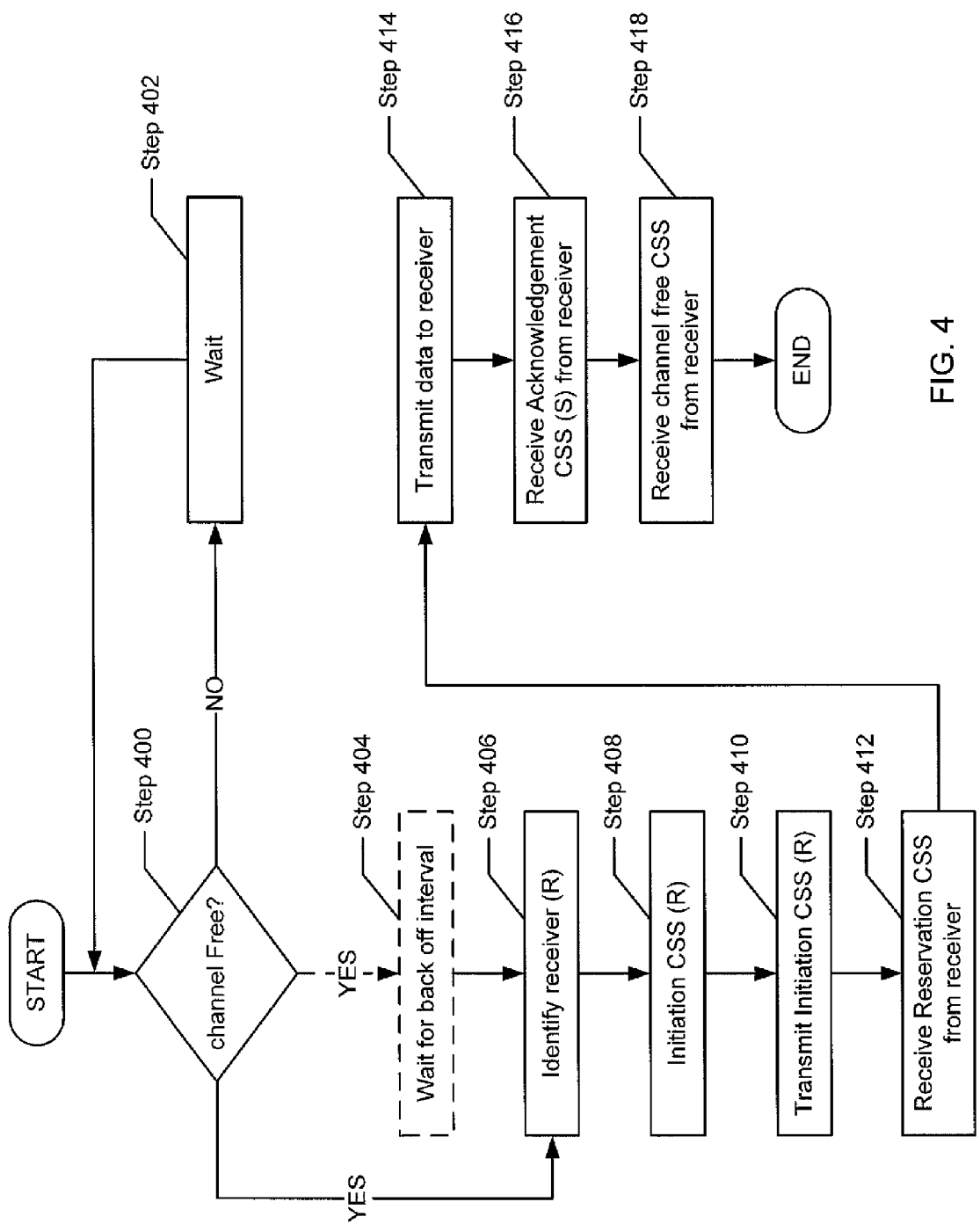
FIG. 4 shows a flowchart of a method for transmitting data from the perspective of a sender in accordance with one or more embodiments of the invention.
Figure 5:
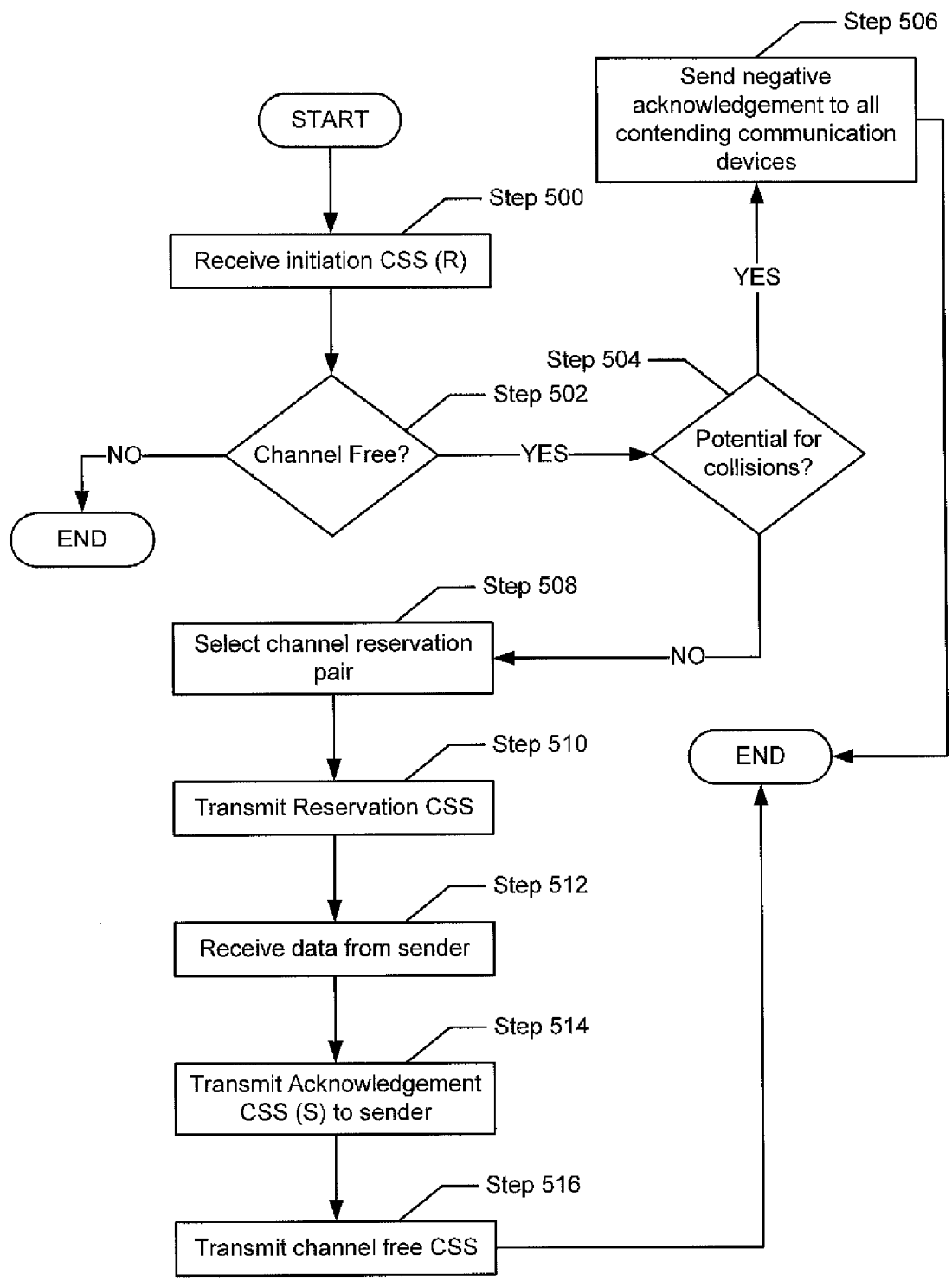
FIG. 5. shows a flowchart of a method for receiving data from the perspective of a receiver in accordance with one or more embodiments of the invention.

FIGS. 4-5 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel.

FIG. 4 shows a flowchart of a method for transmitting data from the perspective of a sender in accordance with one or more embodiments of the invention. FIG. 5 shows a flowchart of a method for receiving data from the perspective of a receiver in accordance with one or more embodiments of the invention.

Turning to FIG. 4, in Step 400, a determination is made about whether the channel is free. In one embodiment of the invention, the channel is free if the sender is not awaiting a Channel Free CSS. Those skilled in the art will appreciate that any other form of physical or virtual carrier sensing may be used without departing from the invention. If the channel is free the process proceeds to Step 404 (or 406); otherwise, the process proceeds to step 402.

In Step 402, the sender waits a predetermined period of time or until an appropriate Channel Free CSS is correlated, and then returns to Step 400. In Step 404, the sender may optionally wait for a back off interval before proceeding to Step 406. Though not shown in FIG. 4, in one embodiment of the invention, if a reservation CSS is received during the back off interval, the process may proceed to step 402 instead of Step 406.

In Step 406, the receiver (i.e., the communication device to which the sender is attempting to send data) is identified. In Step 408, an appropriate Initiation CSS (R) is selected based on the intended receiver. In Step 410, the Initiation CSS (R) is transmitted on the channel. In one embodiment of the invention, the duration of the transmission of the Initiation CSS is nearly zero due to the fact that the Initiation CSS (R) is a short binary sequence (in absolute or relative terms). The Initiation CSS (R) is a private reservation primitive. As such, only the intended receiver can correlate the Initiation CSS (R). All other communication devices in the transmission range that receive the Initiation CSS (R) will view the Initiation CSS (R) as white noise.

At this stage, the sender starts waiting for a pre-determined period of time. During this time the sender is expecting to receive a Reservation CSS from the receiver (identified in Step 406). The pre-determined period of time is larger than the round-trip propagation time between the sender and the receiver. The roundtrip propagation time may be greater than or equal to 2*transmission time+processing delay on the receiver. In order to successfully reserve the channel the Reservation CSS should be received by all communication devices within the transmission range of the receiver. If the receiver transmits the Reservation CSS within the pre-determined period of time, the sender will interpret the receipt of Reservation CSS as a signal that the receiver has reserved the channel and that the sender can start transmitting data to the receiver. All other communication devices in the transmission range that receive the Reservation CSS will interpret the Reservation CSS as an indication that another communication device has reserved the channel and, as such, they are not to attempt to reserve or access the channel until an appropriate Channel Free CSS is received.

Returning to FIG. 4, in Step 412, a Reservation CSS is received from the receiver. If a Reservation CSS has not been received within the predetermined time, then the process may repeat Step 410, return to Step 400, or end. In Step 414, the data is transmitted from the sender to the receiver. In one embodiment of the invention, the sender is configured to start transmitting data immediately (or almost immediately) upon receiving the Reservation CSS. Once the sender has transmitted all the data it intended to transmit, the sender awaits an Acknowledgement CSS from the receiver.

Though not shown in FIG. 4, if the receiver does not receive all the data transmitted by the sender, the receiver will not transmit an Acknowledgement CSS. Instead the receiver will transmit the appropriate Channel Free CSS.

Returning to FIG. 4, assuming that the receiver receives all the data transmitted by the sender, the receiver will transmit an Acknowledgment CSS and in Step 416, the Acknowledgement CSS (S) is received by the sender. The Acknowledgement CSS (S) is a private reservation primitive. As such, only the sender can correlate the Acknowledgement CSS (S). All other communication devices in the transmission range that receive the Acknowledgement CSS (S) will view the Acknowledgement CSS (S) as white noise.

In Step 418, the sender receives and correlates the appropriate Channel Free CSS from the receiver. In addition, all other communication devices in the transmission range can also receive and correlate the Channel Free CSS. The sender and all communication devices that receive the Channel Free CSS interpret the Channel Free CSS as a signal that the receiver who previously sent the Reservation CSS has now freed the channel. The Channel Free CSS should be received by all communication devices that received the Reservation CSS that was previously sent by the receiver.

If a communication device that previously received the Reservation CSS does not receive the Channel Free CSS within a pre-determined period of time (e.g., the longest packet duration) then the communication device will continue operating as if it has received the Channel Free CSS.

Turning to FIG. 5, in Step 500, an Initiation CSS (R) is received from a sender.

In Step 502, a determination is made about whether the channel is free. In one embodiment of the invention, the channel is free if the receiver is not waiting to receive a Channel Free CSS. Those skilled in the art will appreciate that any other form of physical or virtual carrier sensing may be used without departing from the invention. If the channel is free the process proceeds to Step 504; otherwise, the process ends.

In step 504, a determination is made about whether there is a potential for collisions. In one embodiment of the invention, the receiver waits for a roundtrip propagation time to elapse and if during this time the receiver does not receive (i) an Initiation CSS (R) from another sender or (ii) a Reservation CSS from another sender, then the process proceeds to Step 508. Alternatively, the process proceeds to Step 506.

In Step 506, a negative acknowledgment is sent to all contending communication devices. In one embodiment of the invention, the negative acknowledgement is a public CSS received by all senders in the transmission range of the receiver. Then, in order to solve the potential collision, senders may undergo a "quick back off" which includes waiting for a short back off time. If the channel is reserved by another communication device during the quick back off, the one or more senders that have not reserved the channel go idle and, once the channel becomes free again, the sender(s) starts a new regular back off. If instead the quick back off expires (i.e., without being reserved), one or more of the senders transmits a new Initiation CSS.

Returning to FIG. 5, in Step 508, a channel reservation pair is selected. If there is only one channel reservation in the CSS dictionary, then Step 508 may not be performed. In Step 510, the Reservation CSS from the channel reservation pair is transmitted to the sender and all other communication devices in the transmission range. In one embodiment of the invention, once the Reservation CSS is transmitted, the receiver is expecting to immediately or almost immediately receive the data from the sender. If the receiver does not start to receive the data within a pre-determined period of time then there they maybe a transmission issue with the sender and, as such, the process may proceed directly to Step 516.

In Step 512, the data is received from the sender. In Step 514, once receiver has confirmed that it has correctly received all the data sent by the sender, the receiver obtains and transmits an Acknowledgement CSS (S) to the sender. Only the sender is able to correlate the Acknowledgment CSS (S). All other communication devices that received the Acknowledgement CSS (S) view it as white noise.

In Step 516, the sender transmits a Channel Free CSS (from the channel reservation pair) to the sender and all other communication devices in the transmission range. The Channel Free CSS may be transmitted immediately or almost immediately after the Acknowledgment CSS (S) is transmitted.

Figure 6A:
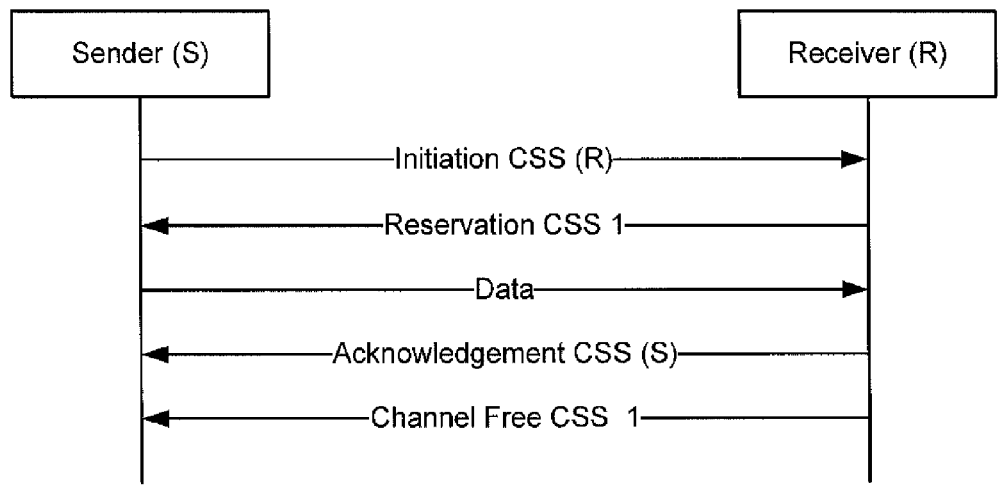
FIGS. 6A and 6B show an example for transmitting data in accordance with one or more embodiments of the invention.
Figure 6B:
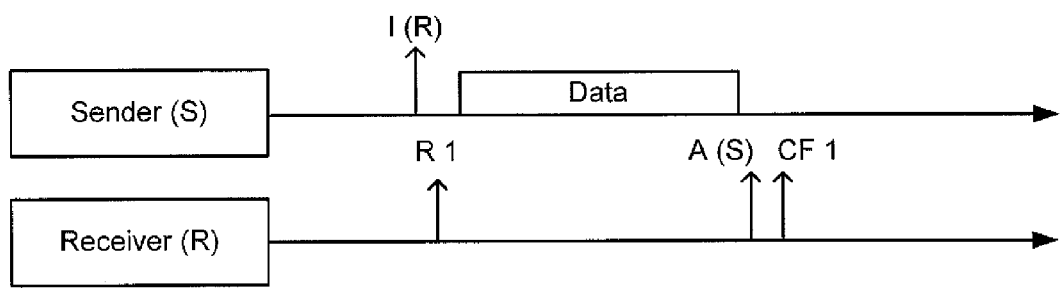
Figure 7:
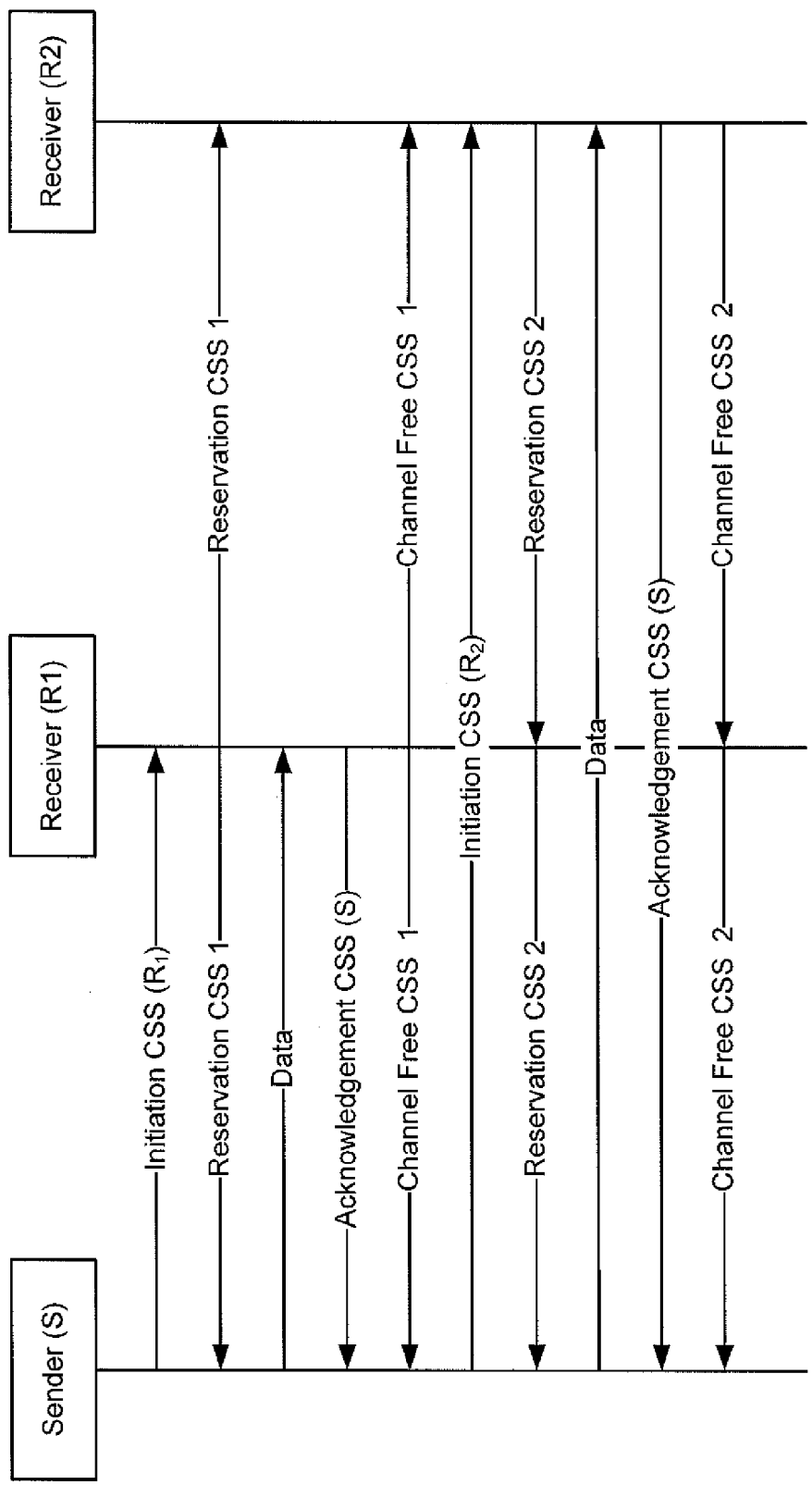
FIG. 7 shows an example of transmitting data in accordance with one or more embodiments of the invention.

FIGS. 6A, 6B and 7 show examples of a system implementing one or more embodiments of the invention. The example is not intended to limit the scope of the invention.

Turning to FIGS. 6A and 6B, FIG. 6A shows the reservation primitives and data sent between a sender and a receiver and FIG. 6B shows the timing of the transmission of the reservation primitives and data transmitted in FIG. 6A.

Initially, the sender transmits an Initiation CSS (R) (I(R)) to the receiver. The receiver immediately (or almost immediately, e.g., the receiver waits for a predetermined period of time in order to detect potential collisions as described in FIG. 5) selects and transmits Reservation CSS 1 (R1) to the sender. Upon receipt of the Reservation CSS, the sender immediately (or almost immediately) transmits the data to the receiver. Once all the data has been received, the receiver transmits an Acknowledgement CSS (S) (A(S)) to the sender. The receiver subsequently transmits a Channel Free CSS 1 (CF 1) to the sender.

Turning to FIG. 7, FIG. 7 shows an example of transmitting data in a system that includes a sender (S) and two receivers (R1, R2) in accordance with one or more embodiments of the invention.

Initially, the sender transmits an Initiation CSS (R1) which may only be correlated by receiver 1. In response to correlating the Initiation CSS (R1), Receiver 1 transmits Reservation CSS 1. Reservation CSS 1 is received and correlated by both the sender and receiver 2. At this stage, receiver 2 will not attempt to initiate any data transfer on the channel until it receivers Channel Free CSS 1.

Upon receipt of Reservation CSS 1, the sender starts transmitting data to receiver 1. Once receiver 1 receives all the data sent from the sender, receiver 1 transmits the acknowledgement CSS (S), which may only be correlated by the sender. Receiver 1 subsequently transmits Channel Free CSS 1. Channel Free CSS 1 is received and correlated by both the sender and receiver 2.

At a later point in time, the sender transmits an Initiation CSS (R2) which may only be correlated by receiver 2. In response to correlating Initiation CSS (R2), receiver 2 transmits Reservation CSS 2. Reservation CSS 2 is received and correlated by both the sender and receiver 1. At this stage, receiver 1 will not attempt to initiate any data transfer on the channel until it receives Channel Free CSS 2.

Upon receipt of Reservation CSS 2, the sender starts transmitting data to receiver 2. Once receiver 2 receives all the data sent from the sender, receiver 2 transmits the acknowledgement CSS (S), which may only be correlated by the sender. Receiver 2 subsequently transmits Channel Free CSS 2. Channel Free CSS 2 is received and correlated by both the sender and receiver 1.

In one or more embodiments of the invention, the use of reservation primitives may provide (i) efficiency, as it enables a near order of magnitude reduction in time required to reserve a channel; (ii) robustness, as the reservation primitives are short and easily detectable even at low Signal to Interference plus Noise Ratios (SINRs), (iii) improved fairness when multiple communication devices with different channel qualities (e.g., data rates) are all communicating on the same channel.

Those skilled in the art will appreciate that while the invention has been described with respect to communication devices only reserving channels using embodiments of the invention, embodiments of the invention may also be implemented in systems that support other channel reservation mechanisms without departing from the invention. For example, embodiments of the invention may be implemented in a hybrid channel reservation system in which channel reservation may be performed using either the RTS/CTS control messages and (ii) reservation primitives as described above.

Further, embodiments of the invention may be applied to other systems that rely on control commands where such commands are converted or otherwise mapped to CSSes and the information that was previously conveyed in the control commands may be conveyed using a combination of (i) public and private CSSes, (ii) the order in which various CSSes are transmitted and/or received, and/or (iii) the relative (or absolute) timing of transmission or receipt of the CSSes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting data from a sender to a receiver over a channel, comprising:
   identifying the receiver;
   obtaining an initiation correlated symbol sequence (CSS) associated with the receiver;
   transmitting the initiation CSS, wherein the sender and the receiver are configured to communicate over the channel, wherein the channel is a frequency band in a radio-frequency spectrum;
   receiving a first reservation CSS from the receiver signaling that the receiver has reserved the channel in order to receive the data from the sender;
   in response to receiving the first reservation CSS, transmitting the data to the receiver; and
   receiving an acknowledgment CSS from the receiver signaling that the receiver has received the data from the sender.

2. The method of claim 1, further comprising:
   receiving a first Channel Free CSS from the receiver signaling that the channel is no longer reserved by the receiver.

3. The method of claim 2,
   wherein a second receiver is configured to receive the first reservation CSS and the first Channel Free CSS from the receiver over the channel;
   wherein the sender and all communication devices communicating on the channel can correlate the first reservation CSS; and
   wherein the sender and all communication devices communicating on the channel can correlate the first Channel Free CSS.

4. The method of claim 1, wherein the initiation CSS, the acknowledgement CSS, the first reservation CSS, and the first channel Free CSS are at least one selected from a group consisting of Gold Codes, Kasami codes, and m-sequences.

5. The method of claim 1, wherein the initiation CSS, the acknowledgement CSS, the first reservation CSS, and the first channel Free CSS are, each 127-bit binary sequences.

6. The method of claim 1, further comprising:
   prior to transmitting the initiation CSS, determining that the channel is free, wherein determining that the channel is free comprises using at least one selected from a group consisting of virtual carrier sensing and physical carrier sensing.

7. The method of claim 1, receiving the first reservation CSS from the receiver comprises correlating the first reservation CSS in a physical layer in the sender.

8. The method of claim 1,
   wherein a second receiver is configured to receive the initiation CSS from the sender over the channel;
   wherein a second receiver is configured to receive the first reservation CSS and the acknowledgement CSS from the receiver over the channel,
   wherein the second receiver views the initiation CSS as white noise,
   wherein the second receiver is able to correlate the first reservation CSS, and
   wherein the second receiver views the acknowledgment CSS as white noise.

9. The method of claim 1,
   wherein the receiver is one of a plurality of communication devices,
   wherein each of the plurality of communication devices is configured to receive the initiation CSS from the sender,
   wherein only the receiver can correlate the initiation CSS.

10. The method of claim 1, wherein the first reservation CSS and the first Channel Free CSS are part of a channel reservation pair and wherein the channel can only be freed if the receiver transmits the first Channel Free CSS when the channel is reserved using the first reservation channel CSS.

11. The method of claim 10, wherein the receiver comprises a second channel reservation pair comprising a second reservation CSS and a second Channel Free CSS.

12. A method for receiving data by a receiver from a sender over a channel, comprising:
   receiving an initiation correlated symbol sequence (CSS) from the sender over the channel, wherein sender and the receiver are configured to communicate wirelessly over the channel, wherein the channel is a frequency band in a radio-frequency spectrum;
   in response to receiving the initiation CSS, transmitting a reservation CSS to the sender signaling that the receiver has reserved the channel in order to receive the data from the sender;

in response to transmitting the reservation CSS, receiving the data from the sender; and after the data has been received:

transmitting an acknowledgment CSS to the sender signaling that the receiver has received the data from the sender;

transmitting a Channel Free CSS from the receiver signaling that the channel is no longer reserved by the receiver.

13. The method of claim 12, further comprising:

prior to transmitting the reservation CSS:

waiting for a pre-determined period of time; and determining that no potentially overlapping transmissions were identified during the pre-determined period of time.

14. The method of claim 13, wherein the pre-determined period of time is equal to a round-trip propagation time.

15. The method of claim 14, wherein the reservation CSS is transmitted immediately after the pre-determined time period.

16. The method of claim 12, wherein a second receiver is configured to receive the initiation CSS from the sender over the channel;

wherein a second receiver is configured to receive the reservation CSS, the acknowledgement CSS, and the Channel Free CSS from the receiver over the channel, wherein the initiation CSS and the acknowledgment CSS and are private reservation primitives, wherein the reservation CSS and the channel free CSS are public reservation primitives.

17. A system, comprising:

a sender, a receiver, and a second receiver, wherein the sender is a first communication device comprising a first processor and a first communication interface, the receiver is a second communication device comprising a second processor and a second communication interface, and the second receiver is a third communication device comprising a third processor and a third communication interface, wherein the sender, the receiver, and the second receiver are configured to communicate over the channel, wherein the channel is a frequency band in a radio-frequency spectrum;

wherein the sender is configured to:

identify, by the first processor, the receiver, obtain, by the first communication interface, an initiation correlated symbol sequence (CSS) associated with the receiver, transmit, by the first communication interface, the initiation CSS over the channel, receive, by the first communication interface, a reservation CSS from the receiver signaling that the receiver has reserved the channel in order to receive the data from the sender, in response to receiving the reservation CSS, transmit, by the first communication interface, the data to the receiver, receive, by the first communication interface, an acknowledgment CSS from the receiver signaling that the receiver has received the data from the sender, receive, by the first communication interface, a Channel Free CSS from the receiver signaling that the channel is no longer reserved by the receiver, the receiver configured to:

receive, by the second communication interface, the initiation CSS;

transmit, by the second communication interface, the reservation CSS to the sender;

receive, by the second communication interface, the data from the sender; and after the data has been received:

transmit, by the second communication interface, the acknowledgment CSS over the channel, transmit, by the second communication interface, the Channel Free CSS over the channel, the second receiver configured to:

receive, by the third communication interface, the initiation CSS, the reservation CSS, the acknowledgement CSS, and the Channel Free CSS over the channel, wherein the second receiver cannot correlate the initiation CSS, wherein the second receiver is able to correlate the reservation CSS, wherein the second receiver cannot correlate the acknowledgment CSS, wherein the second receiver is able to correlate the Channel Free CSS.

18. The system of claim 17, wherein the sender, the first receiver, and the second receiver are nodes in an ad hoc network.

19. The system of claim 17, wherein at least one selected from a group consisting of the sender, the receiver, and the second receiver is one selected from a group consisting of a phone, smart phone, a laptop computer, a tablet computer, a wireless router, a wireless access point, gaming console, a set top box, a television, and a desktop computer.

20. The system of claim 17, wherein the sender comprises a physical layer configured to correlate the first reservation CSS.

* * * * *